(12) United States Patent
Wang

(10) Patent No.: US 11,491,852 B2
(45) Date of Patent: Nov. 8, 2022

(54) SUN VISOR HEAD UP DISPLAY

(71) Applicant: Daimay North America Automotive, Inc., Redford, MI (US)

(72) Inventor: Jianhua Wang, Novi, MI (US)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 274 days.

(21) Appl. No.: 16/863,347

(22) Filed: Apr. 30, 2020

(65) Prior Publication Data

US 2020/0376936 A1 Dec. 3, 2020

Related U.S. Application Data

(60) Provisional application No. 62/869,145, filed on Jul. 1, 2019, provisional application No. 62/853,268, filed on May 28, 2019.

(51) Int. Cl.
*B60J 3/02* (2006.01)
*B60K 35/00* (2006.01)

(52) U.S. Cl.
CPC ............. *B60J 3/0208* (2013.01); *B60K 35/00* (2013.01); *B60K 2370/1529* (2019.05); *B60K 2370/166* (2019.05); *B60K 2370/777* (2019.05); *B60Y 2400/92* (2013.01)

(58) Field of Classification Search
CPC ....... B60J 3/0208; B60J 3/0278; B60K 35/00; B60K 2370/1529; B60K 2370/166; B60K 2370/777; B60K 2370/1523; B60K 2370/23; B60K 2370/67; B60Y 2400/92; B60R 2011/0035; B60R 11/0235; B60R 2011/0085; G09F 9/33; G09F 9/35
USPC ......................................................... 296/97.1
See application file for complete search history.

(56) References Cited

U.S. PATENT DOCUMENTS

| | | | | |
|---|---|---|---|---|
| 5,765,898 A | * | 6/1998 | Crotty, III | B60J 3/0208 296/97.5 |
| 5,871,251 A | * | 2/1999 | Welling | B60R 11/0229 362/144 |
| 5,927,792 A | * | 7/1999 | Welling | B60J 3/0204 362/144 |
| 5,971,468 A | * | 10/1999 | King | B60K 35/00 296/97.5 |
| 9,712,741 B2 | * | 7/2017 | Kothari | B60R 11/0235 |
| 10,589,685 B1 | * | 3/2020 | Talavera | A45D 42/16 |
| 11,048,105 B1 | * | 6/2021 | Roy | G06F 3/013 |
| 2009/0179750 A1 | * | 7/2009 | Jachmann | B60Q 7/00 340/473 |
| 2010/0219655 A1 | * | 9/2010 | Rymer, Jr. | B60J 3/0208 296/97.8 |

(Continued)

FOREIGN PATENT DOCUMENTS

DE 102014206202 A1 * 10/2015 ............ B60J 3/0204

*Primary Examiner* — Pinel E Romain
(74) *Attorney, Agent, or Firm* — Carlson, Gaskey & Olds, P.C.

(57) ABSTRACT

A sun visor assembly for a vehicle according to an exemplary aspect of the present disclosure includes, among other things, a visor configured to be mounted in a vehicle and pivotable between a first position and a second position. A display is mounted on the visor. The display is pivotable between a stowed position and a viewing position relative to the visor.

20 Claims, 5 Drawing Sheets

(56) References Cited

U.S. PATENT DOCUMENTS

| | | | |
|---|---|---|---|
| 2011/0109117 A1* | 5/2011 | Marcus | B60J 3/0208 |
| | | | 296/97.5 |
| 2013/0016429 A1* | 1/2013 | Li | B60J 3/0208 |
| | | | 296/97.5 |
| 2015/0291098 A1* | 10/2015 | Pendlebury | B60J 3/0282 |
| | | | 296/97.5 |
| 2015/0360618 A1* | 12/2015 | Richard | B60R 11/0252 |
| | | | 348/148 |
| 2017/0349098 A1* | 12/2017 | Uhm | G08G 1/0967 |
| 2019/0389282 A1* | 12/2019 | Wang | B60J 3/0243 |
| 2020/0047685 A1* | 2/2020 | Eide | G09F 13/22 |
| 2020/0276888 A1* | 9/2020 | Huff | B60J 3/0278 |
| 2021/0387512 A1* | 12/2021 | Drake | B60J 3/0265 |

\* cited by examiner

SUN VISOR HEAD UP DISPLAY

PRIORITY CLAIM

This application claims the benefit of U.S. Provisional Application No. 62/853,268 filed on May 28, 2019 and U.S. Provisional No. 62/869,145 filed on Jul. 1, 2019.

TECHNICAL FIELD

This disclosure relates to a sun visor, and more particularly a sun visor near a windshield of a motor vehicle.

BACKGROUND

This disclosure relates to a sun visor at a windshield of a motor vehicle.

Some passenger vehicles include sun visors attached to a windshield or roof of a vehicle. Sun visors may be located at the driver and passenger seat, for example, and protect the driver and passenger from bright sunlight. Some known sun visors pivot to a stowed position when not in use, and may include a light and/or a vanity mirror.

SUMMARY

A sun visor assembly for a vehicle according to an exemplary aspect of the present disclosure includes, among other things, a visor configured to be mounted in a vehicle and pivotable between a first position and a second position. A display is mounted on the visor. The display is pivotable between a stowed position and a viewing position.

In a further embodiment, the display is configured to be in the viewing position when the visor is in the first position.

In a further embodiment, the display is configured to be in the viewing position when the visor is in the second position.

In a further embodiment, the display is mounted in a window on the visor, such that the display can be viewed when the visor is in the first position and the second position.

In a further embodiment, a frame surrounds the window, and the display is mounted to the frame.

In a further embodiment, the display is one of an LCD, LED, OLED, or transparent display.

In a further embodiment, the visor has a first side and a second side, the display is mounted on the first side, and a mirror is mounted on the second side.

In a further embodiment, the display is configured to display information to the driver, the information being at least one of navigation information, the current time, a speed limit, weather, GPS data, and body control module information.

In a further embodiment, the display is configured to communicate with one of a vehicle information system and a mobile device.

In a further embodiment, the display is configured to communicate wirelessly with the vehicle information system or the mobile device.

In a further embodiment, the visor is configured to pivot about a first axis and a second axis.

In a further embodiment, the display is configured to pivot about a third axis that is substantially parallel to the first axis.

A vehicle according to an exemplary aspect of the present disclosure includes, among other things, a seat, a window near the seat, and a visor mounted near the window and the seat. The visor is pivotable between a first position and a second position. A display is mounted on the visor. The display is pivotable between a stowed position and a viewing position relative to the visor.

In a further embodiment, the first position corresponds to a stowed position and the second position corresponds to a deployed position.

In a further embodiment, the display is configured to display information for an occupant of the seat.

In a further embodiment, the information is at least one of navigation information, the current time, a speed limit, weather, GPS data, and body control module information.

In a further embodiment, the visor is configured to pivot about a first axis and a second axis.

In a further embodiment, the display is configured to pivot about a third axis that is substantially parallel to the first axis.

In a further embodiment, the display is mounted in a window on the visor, such that the display can be viewed when the visor is in the first position and the second position.

In a further embodiment, the display is in communication with a vehicle information system in the vehicle.

DETAILED DESCRIPTION

Figure 1:
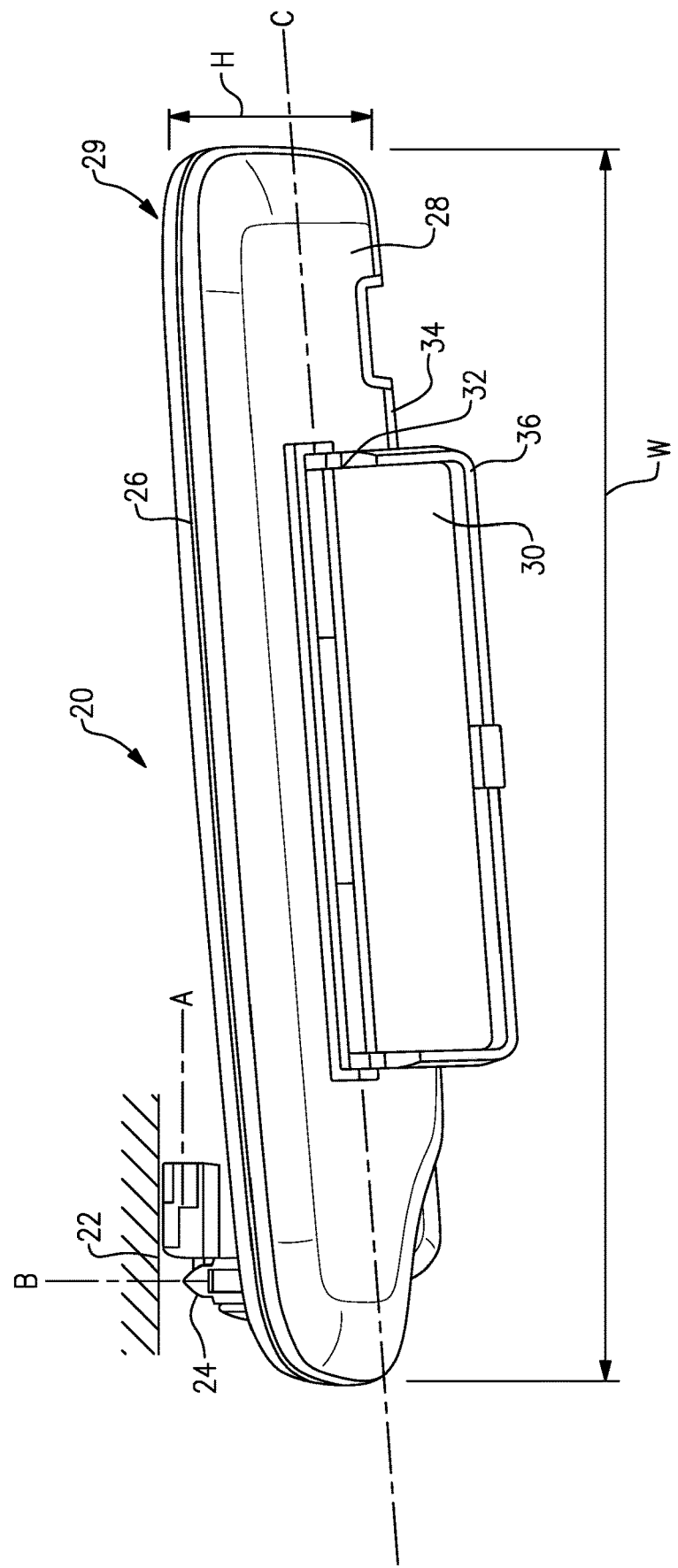
FIG. 1 illustrates an example sun visor assembly.

FIG. 1 illustrates an example sun visor assembly 20. In this example, the sun visor assembly 20 is mounted in a vehicle cabin 22 via a mount 24. The mount 24 may be attached to a corner of a windshield or roof of the vehicle cabin 22, for example. The sun visor assembly 20 may be mounted in the vehicle cabin 22 at the driver's side, passenger side, or both.

The assembly 20 includes a visor 26. The visor 26 may be generally rectangular in shape, and have a generally uniform thickness. The visor 26 is substantially flat and has a first side 28 and a second side 29. The visor 26 generally has a width W and a height H. The width W is the distance across the windshield that the visor 26 takes up.

The visor 26 is movable between a stowed position and a deployed position. In the stowed position, the visor 26 is generally adjacent a roof of the vehicle, while in the deployed position, the visor 26 is generally adjacent a windshield of the vehicle. In other words, in the stowed position, the first side 28 faces down towards the driver, while the second side 29 is substantially parallel to and adjacent the roof of the vehicle. In the deployed position, the first side 28 is facing towards the windshield, while the second side 29 faces toward the driver. In this example, the visor 26 moves between the stowed and deployed positions by pivoting about an axis A. The visor 26 may also move in a direction parallel to the axis A, to allow the driver of the vehicle to further adjust the visor 26. In some examples, the visor 26 is also pivotable about an axis B.

The visor 26 includes a display 30 mounted via a frame 36. The display 30 may be a screen, for example. In the illustrated example, the display 30 is arranged on the first side 28 near a top edge 34 of the visor 26. In some examples, it may be arranged along a different edge, such as a side edge. In other examples, the display 30 and frame 36 may be arranged in the middle of the visor 26. The display 30 and frame 36 may extend more than half the width W of the visor 26, or may be smaller. The display 30 is mounted to the visor 26 on the first side 28. The display 30 is arranged such that a top edge 32 is substantially parallel to a top edge 34 of the visor 26. In an embodiment, the display 30 is substantially rectangular in shape. The display 30 and frame 36 are substantially flat and may be integrated into the visor 26 such that they do not add additional thickness to the assembly 20. The display 30 may be an LCD, LED, OLED, or transparent display, for example. In some examples, the visor 26 may include a light and vanity mirror on the second side 29.

The display 30 and frame 36 are configured to pivot relative to the visor 26 about an axis C. In some examples, the axis C is substantially parallel to the axis A. Thus, the display 30 may be movable between a stowed position and a deployed or viewing position. In the deployed position, the display 30 is viewable to the driver. The display 30 displays information to the driver and/or a passenger in the vehicle. For example, the display 30 may display information regarding navigation. The display 30 may display an expected arrival time and the next turn or exit, for example. The display 30 may also display the current time, a speed limit, weather and/or GPS data, or body control module (BCM) information such as the current vehicle speed and/or fuel levels, for example. In an embodiment, the information that is displayed may be programmed as a variable based on the vehicle manufacturer's design and position. In some examples, the display 30 is turned off when the display 30 is in the stowed position and the display 30 is on when in the viewing position. The display 30 may automatically turn on and off based on the position of the display 30, in some examples.

The visor assembly 20 may receive data from a vehicle information system in the vehicle cabin 22 and/or data from a mobile device, such as a smart phone, for example. In one example, the visor assembly 20 communicates with the vehicle information system or mobile device via a Bluetooth connection. In another example, the visor assembly 20 communicates with the vehicle information system via a wired connection, such as at the mount 24.

In one embodiment, the electronic components, such as the display 130 and a vanity light, of the visor assembly 20 may be powered by a lithium battery. In another embodiment, the visor assembly 20 receives power from the vehicle through the mount 24.

Figure 2:
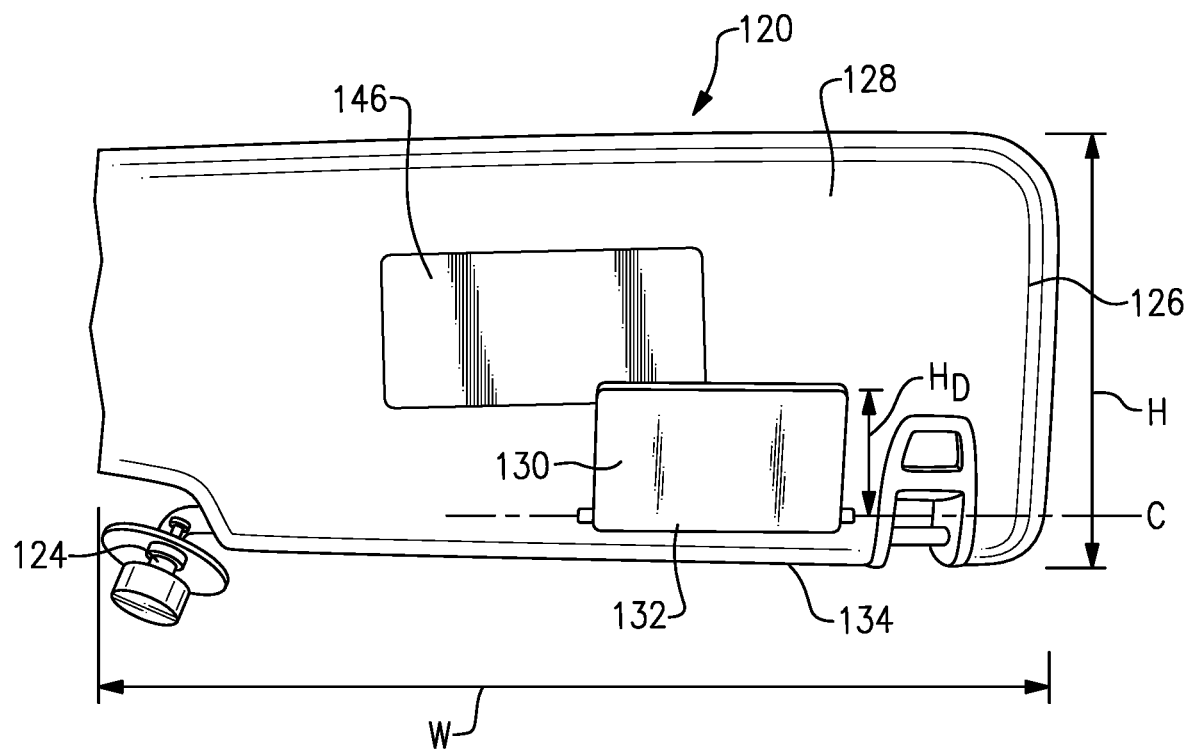
FIG. 2 illustrates another example sun visor assembly in a first position.

FIG. 2 illustrates another example visor assembly 120 having a display 130. In this illustration, the display 130 is in the stowed position relative to the visor 126. In other words, the display 130 is adjacent the first side 128 of the visor 126 and is substantially parallel to the visor 126.

The National Highway Traffic and Safety Administration ("NHTSA") requires certain warning labels to be posted on sun visors in some vehicles. In one embodiment, the warning label 146 may be placed on the first side 128 of the visor 126. In other embodiments, the warning label 146 may be placed on the vehicle 122 near the visor assembly 120.

Figure 3:
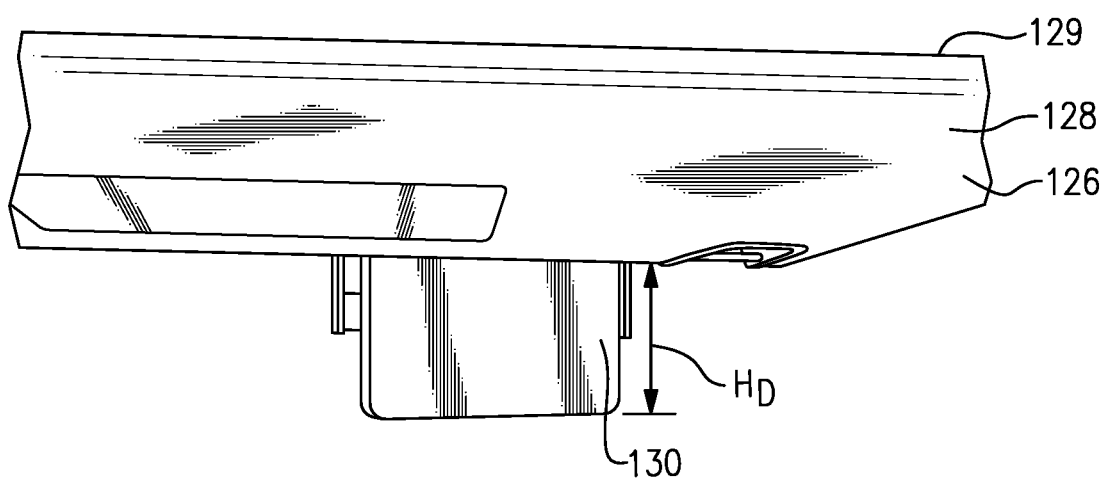
FIG. 3 illustrates the example sun visor assembly of FIG. 2 in a second position.

FIG. 3 illustrates the example visor assembly 120 with the display 130 in the deployed or viewing position. Generally, when the display 130 is in the deployed or viewing position, the visor 126 is in the stowed position near the vehicle roof. The display 130 may be generally perpendicular to the visor 126. In some embodiments, the display 130 may be arranged at an angle relative to the visor 126. The display 130 is positioned such that the driver can easily see the display 130 while driving. The display 130 thus acts as a head-up display, by being viewable by the driver without the driver having to glance down.

Figure 4:
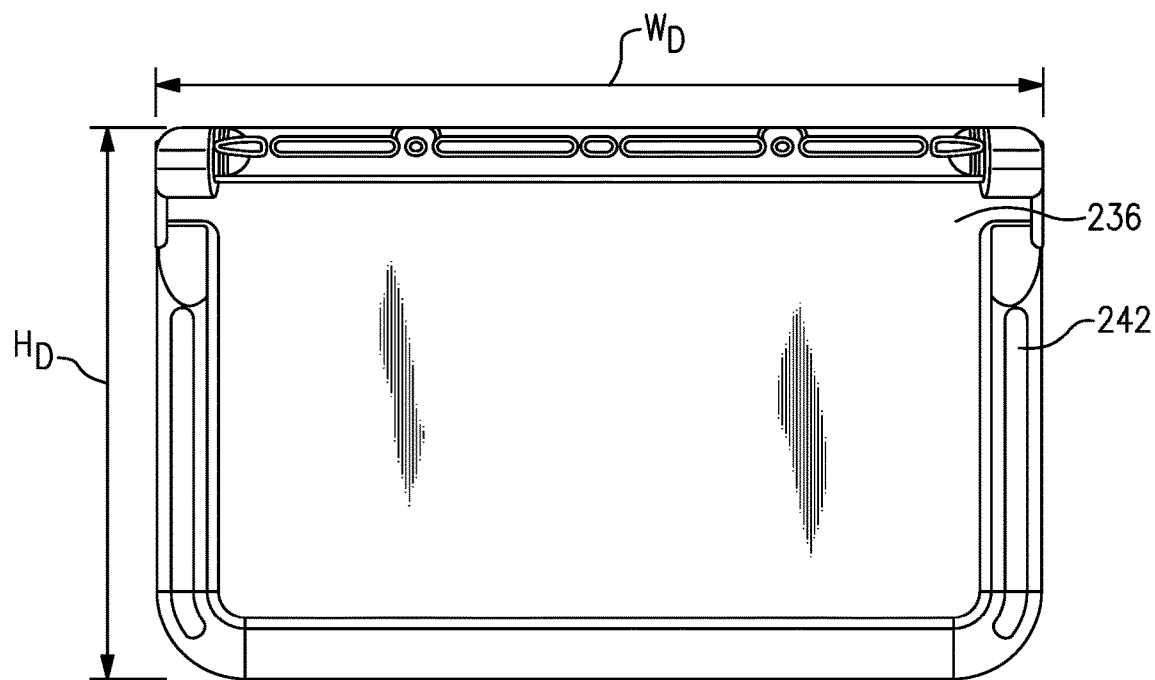
FIG. 4 illustrates an example display frame for a sun visor assembly.

FIG. 4 illustrates an example display frame 236 for a visor assembly. The frame 236 is generally flat and rectangular in shape. The frame 236 is sized to mount a display. In some embodiments, the frame 236 may have a thicker perimeter 242 for mounting a display. The frame 236 generally has a display width $W_D$ and a display height $H_D$. In this embodiment the frame 236 has an aspect ratio of width $W_D$ to height $H_D$ of about 1.7. In an example, the width $W_D$ is about 81 mm and the height $H_D$ is about 46 mm. This example frame 236 takes up a small portion of the width W of the visor. For example, the display width $W_D$ is less than half of the visor width W. Generally, the display height $H_D$ is smaller than the visor height H (as shown in FIG. 2).

Figure 5:
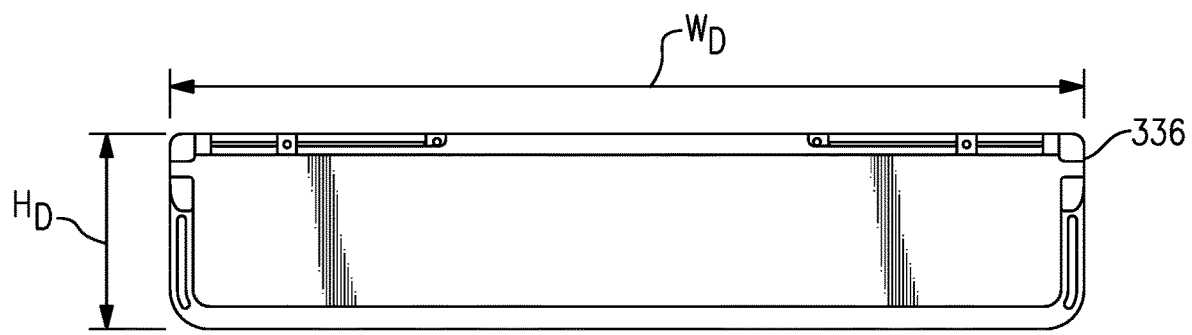
FIG. 5 illustrates another example display frame for a sun visor assembly.

FIG. 5 illustrates another example display frame 336 for a visor assembly. In this example, the frame 336 has an aspect ratio of width $W_D$ to height $H_D$ of about 6. In an example, the display width $W_D$ is about 201 mm and the height $H_D$ is about 33 mm. In this example, the display frame 336 takes up a larger portion of the width W of the visor. For example, the display width $W_D$ is more than half of the width W of the visor. Generally the display width $W_D$ is smaller than the visor width W. The size and shape of the display and frame may vary. In some examples, the display size and shape is selected to display particular information and permit the driver to easily glance at the display without distracting from the road.

Figure 6:
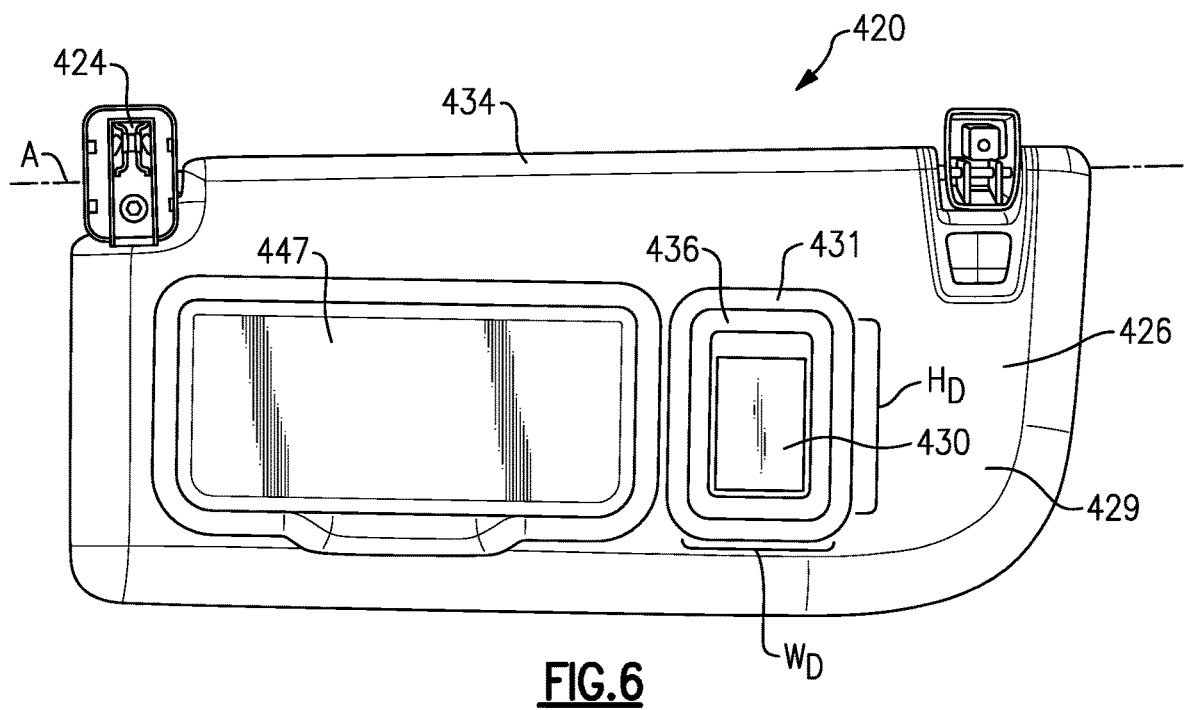
FIG. 6 illustrates a view of another example sun visor assembly.

FIG. 6 illustrates another example sun visor assembly 420. The assembly 420 includes a visor 426 having a first side 428 (FIG. 7) and a second side 429. The visor 426 is movable between a stowed position and a deployed position. In the stowed position, the visor 426 is generally adjacent a roof of the vehicle, while in the deployed position, the visor 426 is generally adjacent a windshield of the vehicle. In other words, in the stowed position, the first side 428 faces down towards the driver, while the second side 429 is substantially parallel to the roof of the vehicle. In the deployed position, the first side 428 is facing towards the windshield, while the second side 429 faces toward the driver. In this example, the visor 26 moves between the stowed and deployed positions by pivoting about an axis A.

The second side 429 includes a vanity mirror 447. The mirror 447 is generally accessible to a vehicle occupant when the sun visor 426 is in the deployed position.

A display 430 is arranged on the visor 426. The display 430 has a frame 436 arranged in a window 431 on the visor 426. The display 430 may be a screen, for example. The display 430 displays information to an occupant of the vehicle. For example, the display 430 may display information regarding navigation, such as expected arrival time or the next turn or exit, for example. The display 430 may also display the current time, a speed limit, weather and/or GPS data, or body control module (BCM) information such as the current vehicle speed and/or fuel levels, for example.

The display 430 has a width $W_D$ and a height $H_D$. In this example, the height $H_D$ is greater than the width $W_D$. In other words, the display 430 has an aspect ratio of width $W_D$ to height $H_D$ of less than one. In other examples, the width $W_D$ may be the same as, or larger than, the height $H_D$.

Figure 7:
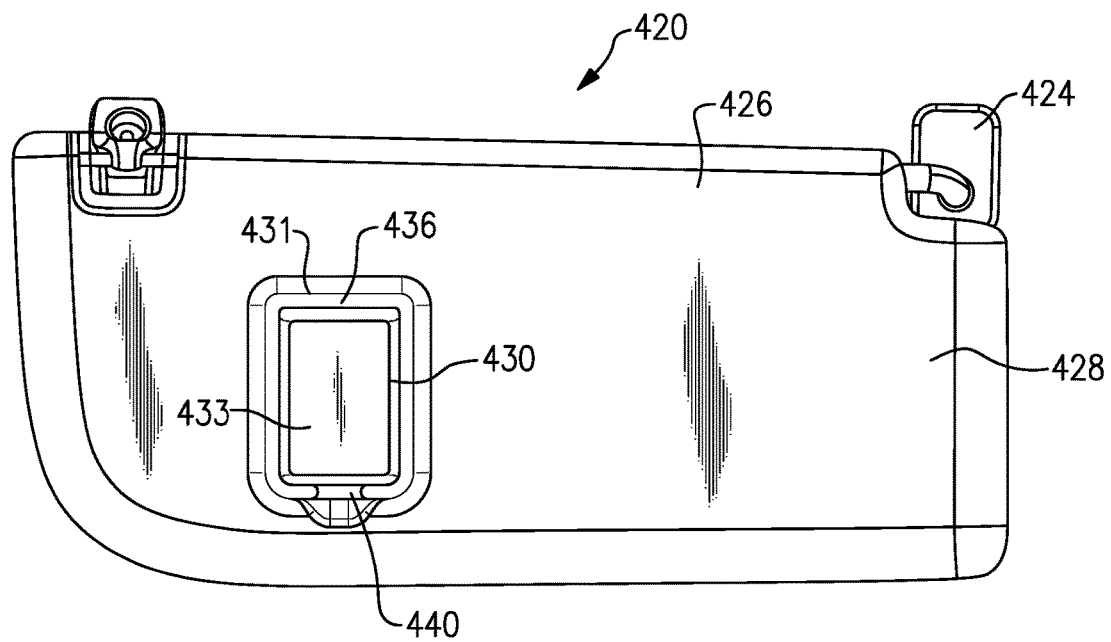
FIG. 7 illustrates another view of the example sun visor assembly of FIG. 6.

FIG. 7 illustrates the first side 428 of the example sun visor assembly 420. The window 431 extends all the way through a thickness dimension of the visor 426 so that a back side 433 of the display 430 is visible on the first side 428. An occupant of the vehicle can thus see the back side 433 of the display 430 while the visor 426 is in the stowed position.

Figure 8:
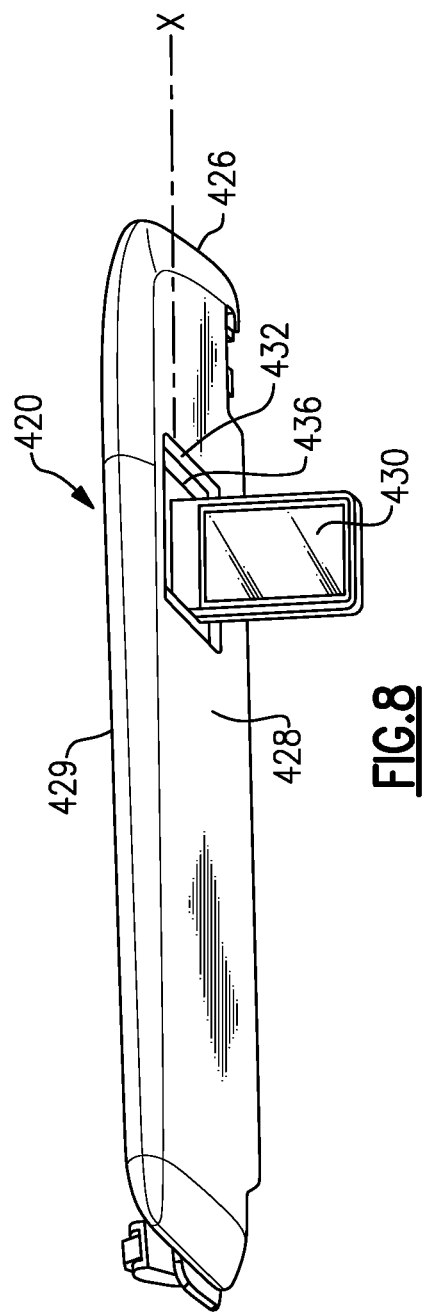
FIG. 8 illustrates another view of the example sun visor assembly of FIG. 6.

The display 430 is rotatable relative to the visor 426, as shown in FIG. 8. The display 430 is rotatable about an axis X between a display extended position and a display stowed position. The axis X may be substantially parallel to the axis A, for example. In this example, when the visor 426 is in the stowed position, the display 430 may be moved into the display extended position for viewing. When the visor 426 is in the deployed position, the display 430 may be viewed in the display stowed position (shown in FIG. 6). This arrangement permits the display 430 to be viewed by an occupant of the vehicle when the visor 426 is in the deployed position or the stowed position.

Figure 9:
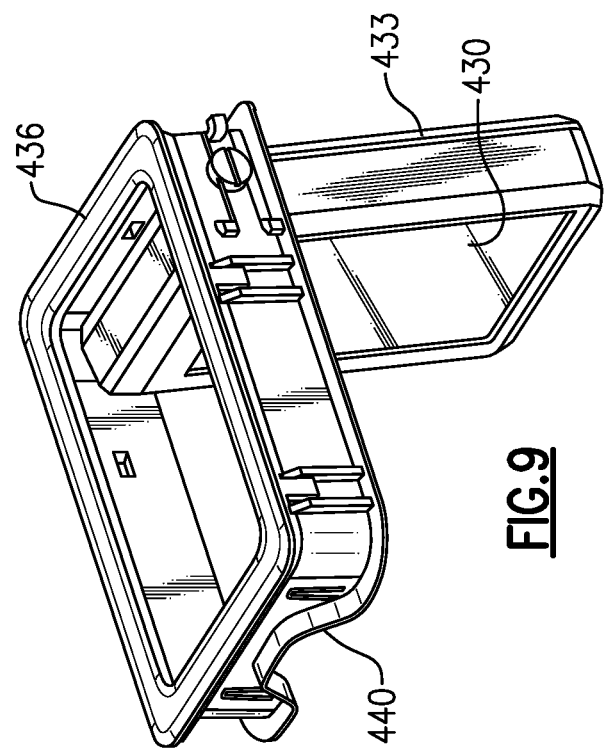
FIG. 9 illustrates a portion of the example sun visor assembly of FIG. 6.

FIG. 9 illustrates the display 430 and frame 436. The frame 436 may extend about the perimeter of the display 430, for example. In some examples, the frame 436 has a notch 440. The notch 440 may help facilitate the rotation of the display 430. The notch 440 may be arranged on a portion of the frame 436 that is adjacent the first side 428 (shown in FIG. 7), to make it easier for an occupant of the vehicle to rotate the display 430 into the display deployed position.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure.

What is claimed is:

1. A sun visor assembly for a vehicle comprising:
a visor configured to be mounted in a vehicle and pivotable between a stowed position and a deployed position;
a window extending through the full thickness of the visor;
a frame received in the window;
a display mounted in the frame;
wherein the display is pivotable relative to the frame between a display stowed position and a display extended position; and
wherein in the display stowed position the perimeter of the display is surrounded by the frame.

2. The sun visor assembly of claim 1, wherein the display is one of an LCD, LED, OLED, or transparent display.

3. The sun visor assembly of claim 1, wherein the display is configured to display information to a driver, the information being at least one of navigation information, the current time, a speed limit, weather, GPS data, and body control module information.

4. The sun visor assembly of claim 1, wherein the display is configured to communicate with one of a vehicle information system and a mobile device.

5. The sun visor assembly of claim 4, wherein the display is configured to communicate wirelessly with the vehicle information system or the mobile device.

6. The sun visor assembly of claim 1, wherein the visor is configured to pivot about a first axis and a second axis.

7. The sun visor assembly of claim 6, wherein the display is configured to pivot about a third axis that is substantially parallel to the first axis.

8. The sun visor assembly of claim 1, further comprising a mirror, and wherein display is laterally offset from the mirror.

9. The sun visor assembly of claim 1, wherein the display includes a height greater than a width.

10. The sun visor assembly of claim 9, wherein the width of the display is less than half a width of the visor.

11. The sun visor assembly of claim 1, wherein the frame includes a notch.

12. A vehicle, comprising:
a seat;
a windshield near the seat;
a visor mounted near the windshield and the seat, the visor pivotable between a stowed position and a deployed position;
a window extending through the full thickness of the visor;
a frame received in the window;
a display mounted in the frame;
wherein the display is pivotable relative to the frame between a display stowed position and a display extended position; and
wherein in the display stowed position the perimeter of the display is surrounded by the frame.

13. The vehicle of claim 12, wherein the display is configured to display information for an occupant of the seat.

14. The vehicle of claim 13, wherein the information is at least one of navigation information, the current time, a speed limit, weather, GPS data, and body control module information.

15. The vehicle of claim 12, wherein the visor is configured to pivot about a first axis and a second axis.

16. The vehicle of claim 15, wherein the display is configured to pivot about a third axis that is substantially parallel to the first axis.

17. The vehicle of claim 12, wherein the display is in communication with a vehicle information system in the vehicle.

18. The vehicle of claim 12, further comprising a mirror, and wherein display is laterally offset from the mirror.

19. The vehicle of claim 12, wherein the display includes a height greater than a width.

20. The vehicle of claim 19, wherein the width of the display is less than half a width of the visor.

* * * * *